United States Patent [19]

Sekioka et al.

[11] Patent Number: 5,281,464

[45] Date of Patent: Jan. 25, 1994

[54] STRUCTURE FOR FINDING WRONG ASSEMBLAGE OF METALLIC LAMINATE TYPE GASKET

[75] Inventors: Kenichi Sekioka, Neyagawa; Kunitoshi Inoue, Yokohama, both of Japan

[73] Assignee: Nippon Gasket Co., Ltd., Osaka, Japan

[21] Appl. No.: 734,893

[22] Filed: Jul. 24, 1991

[30] Foreign Application Priority Data

Sep. 3, 1990 [JP] Japan ................... 2-92951

[51] Int. Cl.$^5$ ................. F16J 15/08; B32B 3/24
[52] U.S. Cl. .................... 428/137; 428/138; 428/916; 428/457; 428/444; 428/596; 277/235 B; 277/2; 29/407; 73/865.8; 73/865.9; 73/432.1
[58] Field of Search .......... 428/138, 137, 916, 457, 428/444, 596; 277/235 B; 29/407; 73/865.8, 865.9, 432.1

[56] References Cited

U.S. PATENT DOCUMENTS

| | | | |
|---|---|---|---|
| 2,089,254 | 8/1937 | Fitzgerald | 428/138 |
| 4,217,384 | 8/1980 | Schnug | 428/138 |
| 4,648,607 | 3/1987 | Yamada et al. | 277/2 |

Primary Examiner—Donald J. Loney
Assistant Examiner—William P. Watkins, III

[57] ABSTRACT

A structure for finding wrong assemblage of the metallic laminate type gasket according to the present invention is composed of a plurality of component sheets overlapping each other, in which small holes for finding wrong assemblage in number one less than the number of sheets to be laminated are bored on each sheet at a part so that, unless any one of the sheets is absent, the small holes are prevented from joining in line like one through hole, whereby whether lamination of the sheets is as complete as designed or not can be confirmed and, when any one of the sheets is absent and small holes join in line like one through hole to pierce through all sheets, wrong assemblage can be confirmed by mechanical or electrical means.

1 Claim, 2 Drawing Sheets

STRUCTURE FOR FINDING WRONG ASSEMBLAGE OF METALLIC LAMINATE TYPE GASKET

BACKGROUND OF INVENTION

1. Field of the Invention

The present invention relates to a structure for finding wrong assemblage of the metallic laminate type gasket composed of a plurality of component sheets overlapping each other.

2. Prior Art

As a conventional structure for finding wrong assemblage of the metallic laminate type gasket composed of a plurality of overlapping component sheets, known is such one that a part of at least one side of each sheet is exposed to the outside so as to be visually confirmed or a part of at least one side of each sheet is laid on a part of the other sheet in a step-like arrangement and exposed to the outside so as to be visually confirmed.

Generally, the operation to laminate component sheets of the metallic laminate type gasket is performed in such manner that the sheets are stacked in the order of laminate and taken one by one for assemblage, whereby wrong assemblage in most cases corresponds to the shortage of sheets caused when the sheets are presumed to be stacked correctly in number but, in reality, are not correctly stacked.

However, in the conventional known structure as above for finding wrong assemblage of the metallic laminate type gasket, since a part of at least one side of each component sheet is exposed to the outside, the number and order of exposed parts small in size must be visually confirmed and, thus, not only confirmation is greatly difficult but also sure finding is prevented by a problem as insufficient exactness in visual confirmation.

When manufacturing component sheets for the structure to find wrong assemblage of the metallic laminate type gasket, metallic dies in various shapes must be prepared because of difference between shapes of the component sheets and, therefore, cause a rise of cost.

SUMMARY OF THE INVENTION

The purport of the present invention consists in a structure for finding wrong assemblage of the metallic laminate type gasket composed of a plurality of overlapping component sheets, which structure is characterized in that each component sheet is provided with small holes in number one less than the number of component sheets to be laminated and bored for finding wrong assemblage in such manner that, when any of component sheets to be laminated is absent, a through hole may be formed in the structure.

An object of the present invention is to confirm whether the required number of component sheets are laminated as completely as designed while depending on the fact that, unless any of component sheets is absent, no through hole for finding wrong assemblage may be formed.

Another object of the invention is to enable mechanical, electrical, or optical exact and efficient finding of wrong assemblage of the metallic laminate type gasket when small holes join in line like one through hole as a result of absence of any of component sheets, and to prevent wrong assemblage of the gasket and consequent leakage of gas therefrom.

Further object of the invention is to provide component sheets for the metallic laminate type gasket at low cost by making component sheets in the same shape.

BRIEF DESCRIPTION OF THE DRAWINGS

Objects and features of the present invention will become apparent from embodiments exemplifying the invention.

DETAILED DESCRIPTION OF THE INVENTION

Embodiments of the invention will be described in detail with reference to the drawings.

Figure 1:
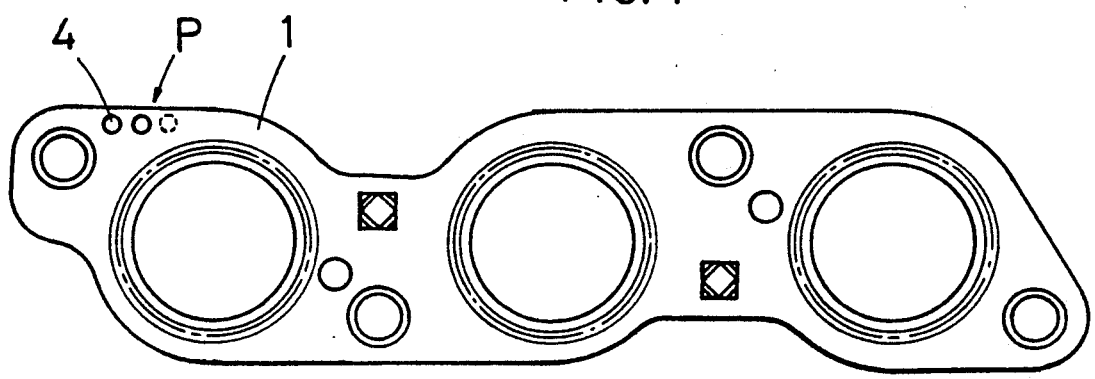
FIG. 1 is a plan of a metallic laminate type gasket composed of three component sheets embodying the invention.
Figure 2:
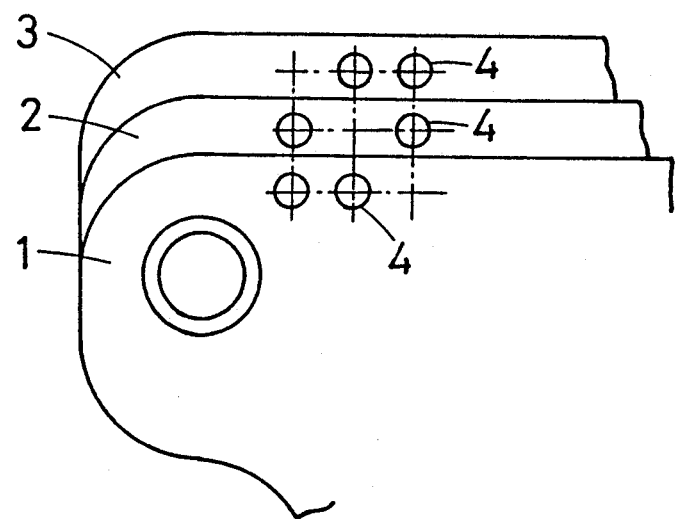
FIG. 2 is a partially exploded plan at a part P in FIG. 1.

FIG. 1 is a plan of a metallic laminate type gasket composed of three component sheets embodying the invention and FIG. 2 is a partially exploded plan of a part P in FIG. 1.

As apparent from the drawings, the component sheets are an upper one 1, middle one 2, and lower one 3, in which small holes 4 for finding wrong assemblage are bored on each sheet in the same positions, on the same part, and at the same pitch as those of the others.

As regards these small holes 4, two are bored on the left side of the upper sheet 1, the other two on the right and left sides of the middle sheet 2 respectively, and further two on the right side of the lower sheet 3.

When the component sheets thus provided with small holes 4 are stacked without absence of any one, none of through hole is formed anywhere, however, when the upper sheet 1 is absent, a through hole is formed on the right side on the drawing whereas, when the middle sheet 2 is absent, a through hole is formed in the central position and, when the lower sheet 3 is absent, a through hole is formed on the left side.

The through hole is automatically and continuously confirmed by mechanical means as flowing air or inserting a pin into the hole or by electric sensing means.

Figure 3:
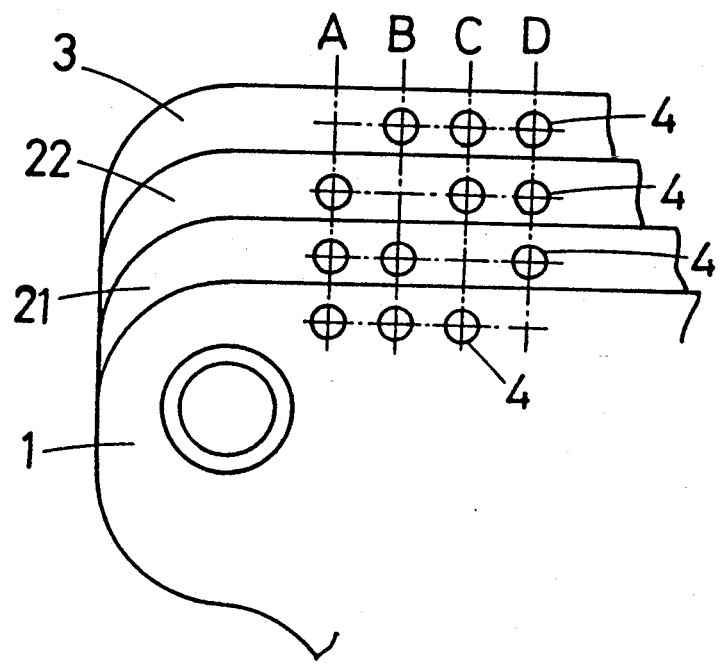
FIG. 3 is a partially exploded plan of a metallic laminate type gasket composed of four component sheets.

FIG. 3 is a view of a gasket composed of four component sheets such as an upper one 1, first middle one 21, second middle one 22, and lower one 3, in which the reference characters A, B, C, and D indicate vertically extending rows and small holes 4 are bored along three rows other than: D on the upper sheet 1; C on the 1st middle one 21; B on the 2nd middle one 22; and A on the lower one 3.

In such a structure as above, when component sheets are laminated without absence of any one, no through hole is formed on any sheet, however, when the 1st middle one is absent, a through hole is formed on the row C and thus wrong assemblage can be found.

Figure 4:
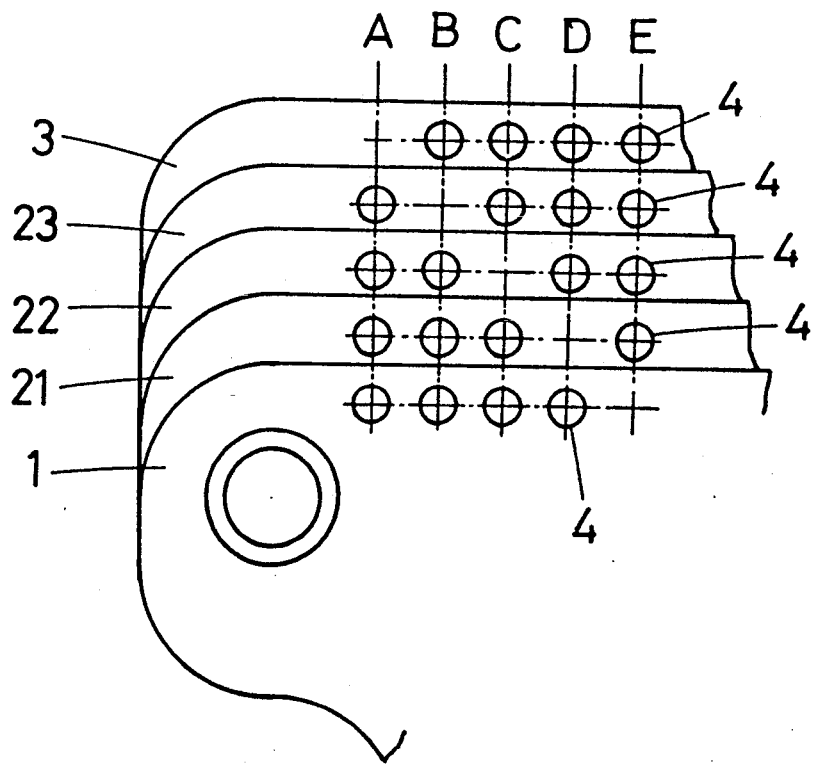
FIG. 4 is a partially exploded plan of a metallic laminate type gasket composed of five component sheets.

FIG. 4 shows a structure composed of five sheets as an upper sheet 1, first middle one 21, second middle one 22, third middle one 23, and lower one 3, in which the characters A, B, C, D, and E indicate vertically extending rows and small holes 4 are bored along four rows other than: E on the upper sheet 1; D on the 1st middle one; C on the 2nd middle one; B on the 3rd middle one; and A on the lower one 3.

In such a structure as above, when component sheets are laminated without absence of any one, no through hole is formed on any sheet, however, when, for example, the 3rd middle sheet is absent, a through hole is formed on the row D and thus wrong assemblage can be found.

In the above embodiments, small holes 4 are bored on each sheet at the same positions, on the same part, and at the same pitches as those on the other sheets, however, positions of these holes are not limited as far as a through hole can be formed when any sheet is absent.

We claim:

1. A structure for indicating the absence of one sheet in a plurality of metallic sheets that are to be assembled to form a laminated gasket, said structure comprising a plurality of N sheets, where N is an integer greater than three, wherein said sheets are capable of being aligned in a stack, each sheet having an array of N locations, the locations of the arrays of said plurality of sheets having N groups, each group consisting of N locations, wherein each of said locations in a group is a member of an array of a different sheet and wherein the locations in each group are capable of being aligned during stacking, each sheet having N-1 holes, each hole being formed at one of said N locations in each array, each group of locations having only one location that does not have a hole, wherein at least one through hole is formed during the stacking of less than N sheets, said through hole providing visual indication of the presence of less than N sheets.

* * * * *